United States Patent
Gand et al.

[11] Patent Number: 6,004,086
[45] Date of Patent: Dec. 21, 1999

[54] BREAKABLE-STEM BLIND RIVET AND APPARATUS FOR SETTING THE SAME

[75] Inventors: Andreas Gand; Torsten Gand, both of Garbsen; Harald Knoblauch, Wunstorf, all of Germany

[73] Assignee: Avdel Verbindungselemente GmbH, Germany

[21] Appl. No.: 09/158,856

[22] Filed: Sep. 23, 1998

[51] Int. Cl.⁶ .............................. F16B 13/04; F16B 13/06
[52] U.S. Cl. ................. 411/38; 411/33; 411/43; 411/501
[58] Field of Search ................. 411/32, 33, 34, 411/38, 43, 69, 70, 501

[56] References Cited

U.S. PATENT DOCUMENTS

| | | | |
|---|---|---|---|
| 3,515,419 | 6/1970 | Baugh | 411/70 X |
| 4,089,249 | 5/1978 | Binns | 411/70 X |
| 4,478,544 | 10/1984 | Strand | 411/501 X |
| 4,826,372 | 5/1989 | Kendall | 411/43 |
| 5,248,231 | 9/1993 | Denham et al. | 411/38 X |

*Primary Examiner*—Neill Wilson
*Attorney, Agent, or Firm*—Domingue & Waddell, PLC

[57] ABSTRACT

A breakable-stem blind rivet (5) is having a mandrel (10) with an enlarged head (12) which is positioned in a shell (20). Before the beginning of the setting operation, the shell (20) is having an exterior diameter which at all points is smaller than the interior diameter of the hole (4) in which the breakable-stem blind rivet is to be set. The breakable-stem blind rivet therefore without any preformed set head has basically the form of a hollow cylinder. Preferably the shell (20) on both sides of a central section (21) is provided with areas (23, 25) in which the shell (20) is more easily deformable than in the central section (21). An apparatus for setting the breakable-stem blind rivets of this kind is provided with a workpiece pressing means (32) surrounding a mouth piece (30) which with respect to the mouth piece (30) is relatively movable and is exerting a force onto the front side of the workpiece.

14 Claims, 7 Drawing Sheets

BREAKABLE-STEM BLIND RIVET AND APPARATUS FOR SETTING THE SAME

FIELD OF THE INVENTION

The present invention relates to a breakable-stem blind rivet and to an apparatus for setting the same.

BACKGROUND OF THE INVENTION

The breakable-stem blind rivets presently on the market in general are consisting of a shell having a closing head which is inserted on the side of the workpieces facing the setting tool, wherein from the side of the future blind side a mandrel is inserted into the shell, the head of which generally is corresponding to the exterior diameter of the shell. During the setting operation, the rivet is inserted into an opening through both workpieces to be connected until the closing head is contacting the front workpiece. Thereafter, the mandrel is pulled, whereby behind the workpieces to be connected a so-called blind head or closing head is formed.

Such breakable-stem blind rivets according to the prior art unfortunately only have a rather limited grip range. This means, with such a breakable-stem blind rivet of a given size only workpieces with a relatively small difference in their entire thickness can be connected. Further, the shells for the breakable-stem blind rivets according to the prior art are rather complicated to produce because each the closing head has to be formed. In addition with the usual breakable-stem blind rivets, the workpieces to be connected before the beginning of the setting operation have to be compressed.

It is therefore the task to be solved by the present invention to provide for a breakable-stem blind rivet having a larger grip range, wherein preferably in addition it should be achieved that the shell of the rivet is more simple to produce and that workpieces can be connected which not directly contacting each other before the setting operation and which are pressed together by the setting operation.

According to the invention, this task is solved by the feature that the shell before the beginning of the setting operation has an external diameter which at all points is smaller than the internal diameter of the hole in which the breakable-stem blind rivet is set. By this according to the invention a blind rivet is proposed having no closing head. Only when setting the blind rivet according to the invention on both ends of the shell of the blind rivet closing heads are formed. This has the advantage that the production of the corresponding shells is far more simple (these are consisting basically only of a continuos small tube), and when using a suitable setting apparatus, the workpieces can be riveted together even if they still are having a certain distance to each other before the setting operation and are only pulled together by the setting operation.

To achieve an extremely good formation of the closing heads, an especially preferred embodiment according to the invention it is provided that the shell on both sides of a central section is having areas, in which the shell is more easily deformable than in the central section.

The axial length of the central section herein is corresponding the minimal grip range of the breakable-stem blind rivet.

Such areas, which are more easily deformable, can be achieved in that the shell on both ends has a conically tapering shape.

In this connection it is further preferred to limit the central section by two circumferential grooves, the distance of which to each other is corresponding to the minimal grip range. By this feature, too, the formation of the closing heads is improved.

In an alternative embodiment according to the invention, in an especially preferred mode, the sections being more easily deformable could be formed by a microstructural change of the material of the shell. This has the special advantage, that merely a microstructural change in limited areas on both sides of the central section has to be performed such, that any additional working of the shell can be dispensed with which means that the shell can be produced with parallel exterior walls in a smoothed shape which simplyfies additionally the method of production substantially.

For performing the microstructural change, in an advantageous way, the more easily deformable areas can be produced by induction annealing of corresponding sections of the shell or alternatively by laser annealing.

In an advantageous improvement according to the invention, it is provided that in the central section there is provided a section having a smaller interior diameter and therefore increasing the wall thickness of the shell, the diameter corresponding to the diameter of the mandrel and, that the mandrel in a section adjacent to his head is having a larger diameter, wherein at the transition between the section of the mandrel having the larger diameter and the remainder of the mandrel, there is provided a groove. By this, the advantage is achieved that the central section, which is more difficult to deform, on the one hand, is defined even clearer and, that, on the other hand, after setting the part of the mandrel remaining in the breakable-stem blind rivet securely is fastened by the fact that by means of the section of the mandrel having the larger diameter during the setting of the rivet material from the section with the increased wall thickness is deformed into the groove.

According to the invention, there further is proposed an apparatus for setting breakable-stem blind rivet having the above features, the apparatus having a mouth piece receiving one end of the mandrel in a gripping apparatus by the means of which the mandrel can be pulled with respect to anvil for the shell contained in the mouth piece in the direction of the front side of the workpieces. According to the invention, here it is proposed that the mouth piece is surrounded by a workpiece pressing means, that the workpiece pressing means is relatively movable with respect to the mouth piece and, that by the means of the workpiece pressing means a force acting on the front side of the workpiece can be created. By this apparatus, it is achieved that with the corresponding size of the force, which can act on the near side of the workpiece, given, firstly, the closing head on the blind side is formed while simultaneously the workpiece on the blind side is pulled onto the workpiece on the near side in case the two workpieces before the setting operation were not directly contacting each other. After finishing the formation of the closing head on the blind side and the possibly occurring movement of the workpiece on the blind side, the force created by the gripping means becomes larger than the force acting on the front side of the workpiece by the workpiece pressing means such, that thereafter the closing head on the front side is formed.

With regard to the construction, it is especially preferred in this connection that the mouth piece on the exterior is having a cylindrical shape and is coaxially surrounded by the workpiece pressing means.

In one embodiment of the apparatus according to the invention, the workpiece pressing means is in a controlled manner advancable against the front side of the workpiece and is retractable up the height of the mouth piece. To set a breakable-stem blind rivet with an apparatus according to this embodiment, the workpiece pressing means firstly is advanced such, that the workpiece is contacting the same and thereafter the mandrel is pulled by the gripping means. During this action, the pressing means is relieving the front end of the shell such, that firstly the closing head on the blind side is formed and thereafter the workpiece on the blind side is pulled onto the workpiece on the front side. Thereafter the workpiece pressing means slowly is retracted in the direction of the mouth piece such, that the anvil of the mouth piece is exerting an increasing pressure on the shell of the breakable-stem blind rivet, whereby thereafter the closing head on the front side is formed.

In alternative embodiments of the apparatus according to the invention, the workpiece pressing means is consisting of an elasticly resilient member pressing against the front side of the workpiece, the pressing force of which is chosen such, that corresponding to the resistance of deformation of the ends of the shell, firstly, the closing head on the blind side and only thereafter the closing head on the front side is formed.

In these embodiments, the workpiece pressing means can be consisting of an elastic body of rubber, hard rubber or the like, or can be prestressed in the direction of the front side of the workpiece by a saucer spring or coil spring.

BRIEF DESCRIPTION OF THE DRAWINGS

The present invention in the following is more detailedly described with reference to the drawings showing an embodiment of the invention. In the drawings show.

DETAILED DESCRIPTION OF THE DRAWINGS AND OF THE PREFERRED EMBODIMENT

Figure 1:
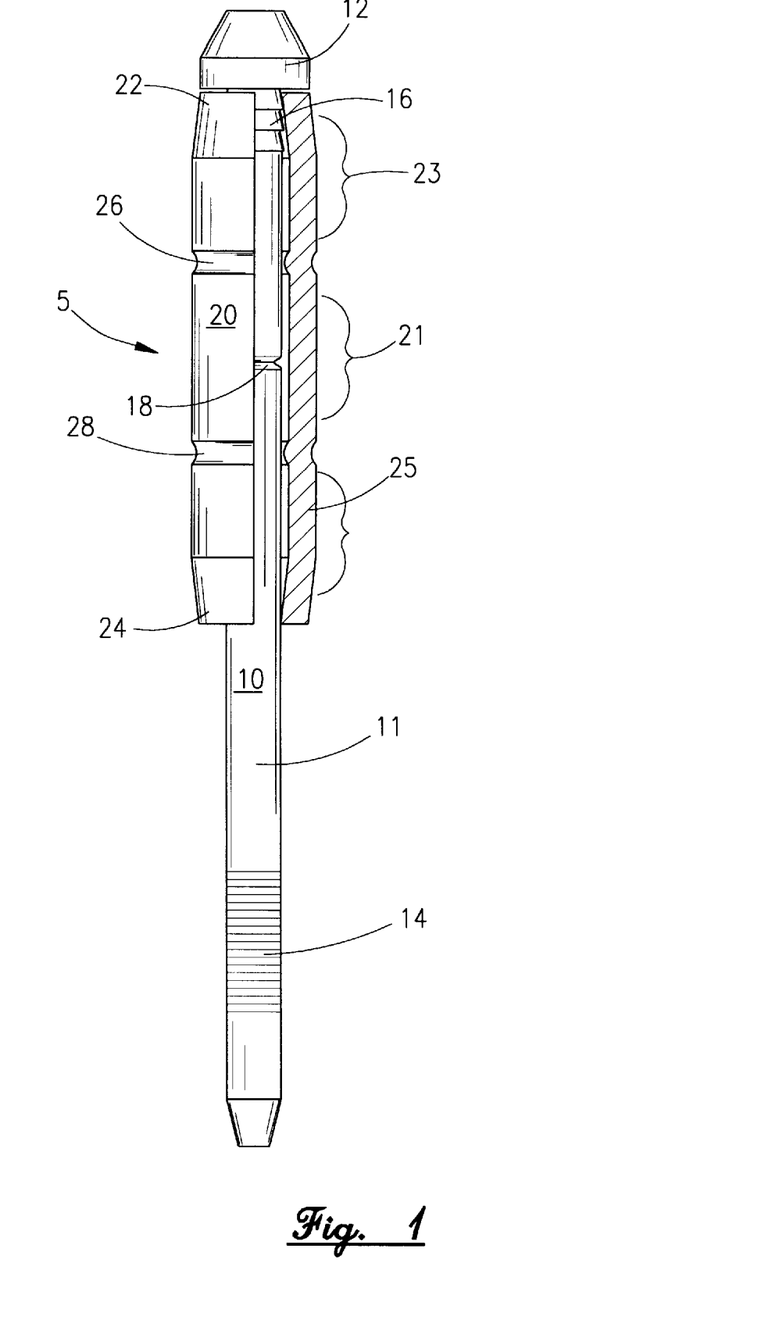
FIG. 1 a first embodiment of the breakable-stem blind rivet in the non-set state.

As shown in FIG. 1, a breakable-stem blind rivet according to the invention is consisting of the usual mandrel 10 which as usual on its end on the blind side is having a head 12. The mandrel is having the usual grooves 14, too, for the grip of the pulling device, recesses 16 for fixing the remainder of the mandrel after the setting operation in the closing head of the blind side and a circumferential groove 18 for forming a break-neck to break the mandrel after the setting of the rivet.

An essential part of the invention is consisting in the shape of the shell 20. The shell 20 nowhere has a larger diameter than the hole 4 in the workpieces 1 and 2 in which the rivet is to be set. Therefore, there is no preformed closing head provided. Contrary, the construction of the shell on the blind side and on the front side basically is symmetric. The both ends 22, 24 of the shell are conically tapering. In the central area of the shell there are provided two grooves 26, 28, the distance to each other corresponding to the minimal grip range of the breakable-stem blind rivet according to the invention. Apart from the above, the shape of the shell 20 basically is corresponding to the shape of a hollow cylinder or a small tube. The combination of the conical ends 22, 24 with the grooves 26, 28 forms on both sides of a central section 21 areas 23, 25 in which the shell can be more easily deformed than in the central section 21.

Figure 2:
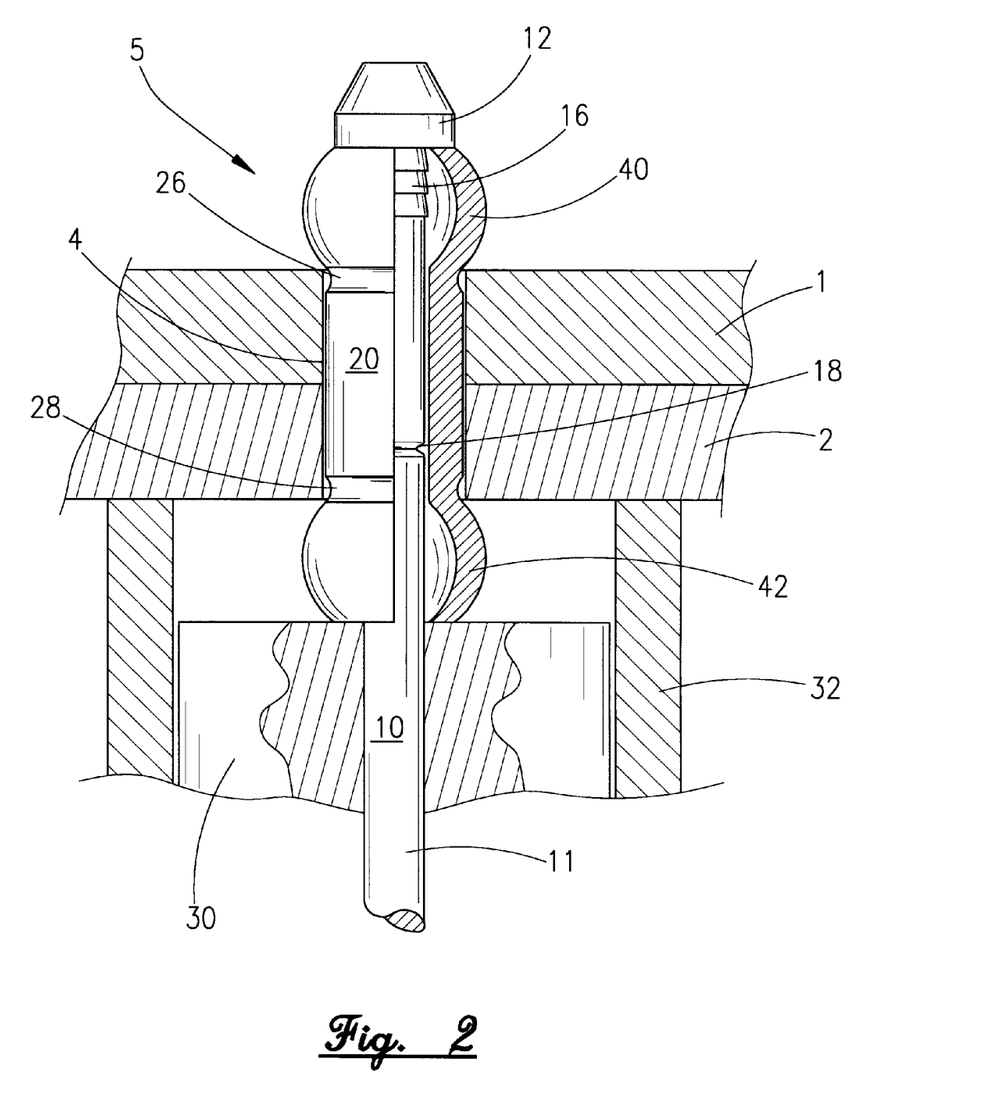
FIG. 2 the breakable-stem blind rivet according to the invention as shown in FIG. 1 during the setting by means of the setting apparatus according to the invention, wherein both closing heads simultaneously are formed.

FIG. 2 shows the breakable-stem blind rivet during the usual setting operation which is used when the workpieces to be connected already before the setting operation are in close proximity to each other and when the optimal use of the possible grip range of the rivet is of importance.

Herein a special apparatus according to the invention for setting such breakable-stem rivets according to the invention is used which more detailedly is described in several embodiments further below. In this apparatus, the mouth piece 30 which basically is consisting of a cylindrical housing 44 in the shape of a tube is surrounded by a coaxial workpiece pressing device 32. Said device basically has the shape of a tube being pushed over the mouth piece 30. In the embodiment according to FIGS. 2 to 4, the workpiece pressing device is movable in a controlled manner relatively to the mouth piece 30.

In the setting operation shown in FIG. 2 before the beginning of the setting operation the workpiece pressing apparatus 32 is completely advanced. The setting apparatus then receives the breakable-stem blind rivet in the usual way in the mouth piece and the breakable-stem blind rivet is inserted into the hole 4 in the workpieces 1 and 2 to be connected and thereafter the stem 11 of the mandrel 10 is pulled, wherein simultaneously the workpiece pressing apparatus 32 is slowly retracted such that the mouth piece 30 is advanced in the direction of the workpieces to be connected. By this simultaneously the closing head 40 on the blind side and the closing head 42 on the near side are formed. The grip range herein can be substantially enlarged since by two closing heads the size of which can be adjusted to the grip range, a grip range is provided which about has the double size. With a maximal thickness of the workpieces to be connected, both closing heads are formed in their minimal size while with a minimal grip range both closing heads achieve their maximal size.

Figure 3:
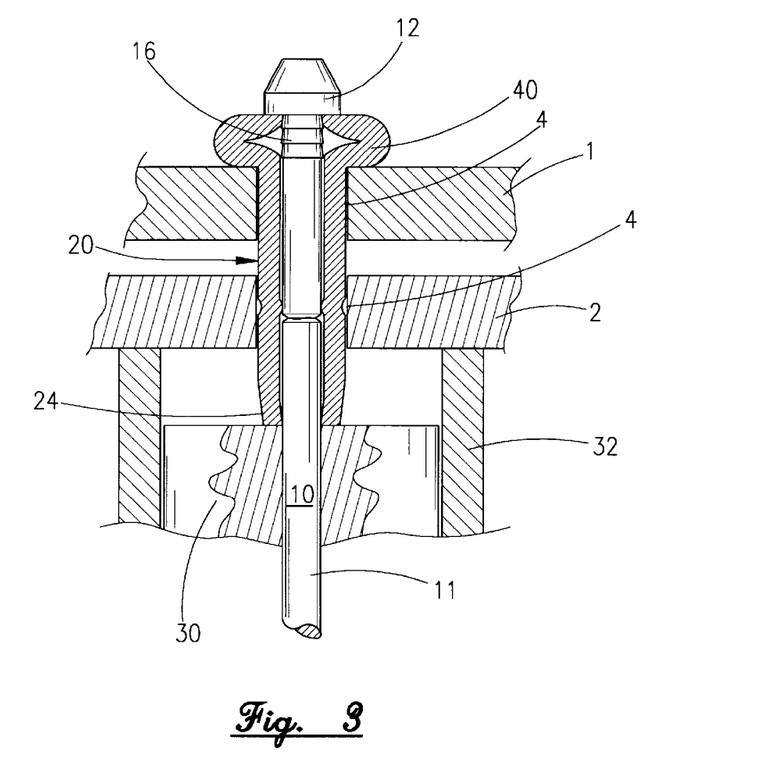
FIG. 3 the breakable-stem blind rivet according to the invention as shown in FIG. 1 during the setting operation, wherein two workpieces are connected which before the setting operation are having a distance to each other (here firstly the closing head on the blind side is formed)
Figure 4:
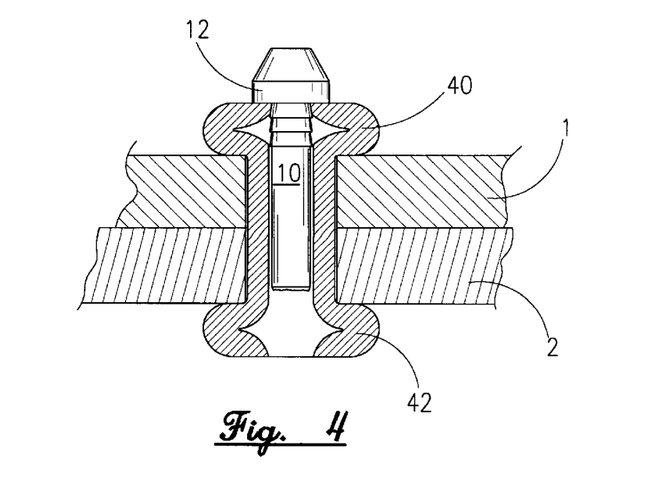
FIG. 4 the breakable-stem blind rivet according to the invention as shown in FIG. 1 after finalizing the setting operation.

FIG. 3 shows a special use of the blind rivet according to the invention in connection with the setting apparatus according to the invention, wherein the connection of two workpieces by means of a blind rivet becomes possible even if these workpieces before the setting operation are not directly contacting each other. The setting operation here is as follows: Before the beginning of the setting, the breakable-stem blind rivet according to the invention as described above in connection with FIG. 2 is inserted into the mouth piece 30, too, and the workpiece pressing apparatus 32 is completely advanced. The breakable-stem blind rivet 5 is inserted into the opening 4 in both workpieces 1 and 2. Thereafter, the mandrel 10 is pulled, too, wherein however the workpiece pressing apparatus 32 remains completely advanced such that the created pulling force is not acting on the near end 24 of the shell 20 of the rivet by the mouth piece 30 but exclusively is acting on the workpieces by means of the workpiece pressing apparatus 32. By this it is achieved that on the one hand firstly the closing head 40 on the blind side is formed and that on the other hand simultaneously hereby both workpieces 1 and 2 are closely pressed together. Only after reaching a pressure sufficient for forming the closing head 40 on the blind side and sufficient for pressing the workpieces 1 and 2 together, the workpiece pressing apparatus 32 is retracted or is moved backward. To do so for example, the workpiece pressing device 32 simply can be pressurized by a spring of corresponding force. Only thereafter by the increasing approach of the mouth piece 30 to the workpieces to be connected, the closing head 42 on the front side is formed.

In FIGS. 5 to 8, there are shown two further especially preferred embodiments of the breakable-stem blind rivet according to the invention, wherein for the same or similar parts the same reference numerals have been used.

Figure 5:
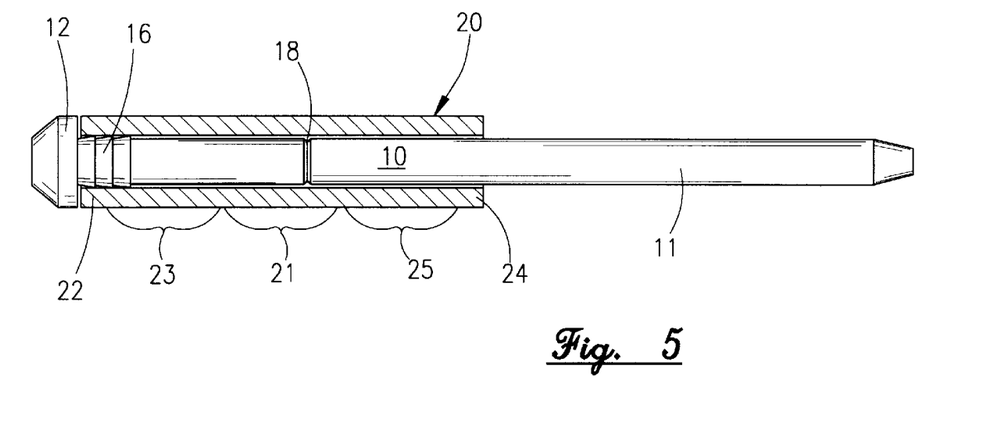
FIG. 5 a second embodiment of the breakable-stem blind rivet according to the invention in the non-set state.
Figure 6:
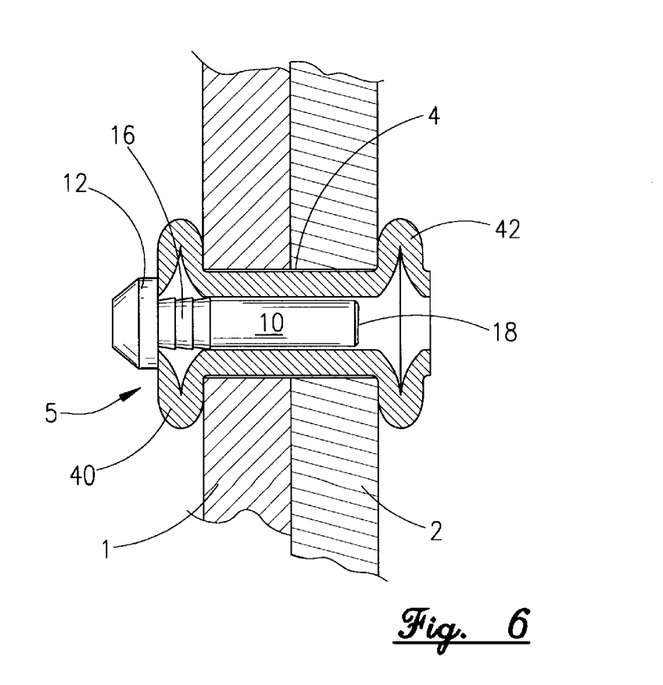
FIG. 6 the breakable-stem blind rivet according to FIG. 1 in the completely set-state.

FIGS. 5 and 6 show one of these two embodiments in the non-set state and in the completely set state, respectively. As shown in this embodiment, the shell 20 is smooth, i.e. is not having conical ends and additional external grooves. On both sides of the central section 21 of the shell 20, herein the areas 23 and 25 being more easily deformable are formed by the fact that the microstructure of the material of the shell had been changed in these areas which for example can be done by induction annealing or laser annealing. The ends 22 and 24 themselves of the shell preferably are not provided with these microstructural changes which means that they are presenting clear contacting areas of the head 12 of the mandrel 10 or the anvil of the mouth piece 30, respectively, described further below.

FIG. 6 shows the breakable-stem blind rivet according to FIG. 5 in the completely set-state, wherein the rivet here is extending through a bore 4 in the workpieces 1 and 2 and is having a closing head 40 on the blind side under the head 12 of the mandrel 10 at a closing head 42 on the front side of the workpieces 1 and 2. Simultaneously, the stem 11 of the mandrel 10 has been broken-off at the groove 18 forming a break-neck. By the recesses 16, the remainder of the mandrel 10 remaining in the blind rivet 5 is fixedly secured.

Figure 7:
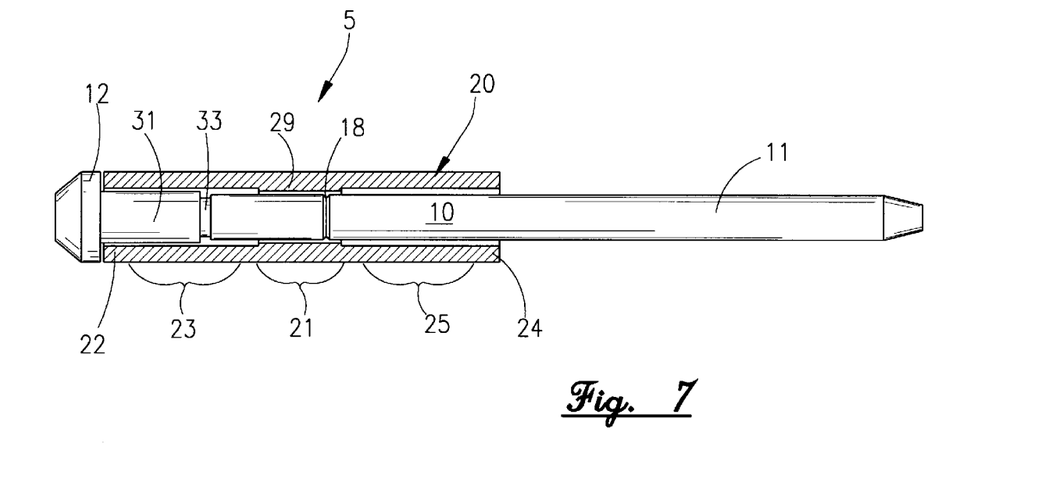
FIG. 7 a further third embodiment of an breakable stem blind rivet according to the invention in the non-set state.
Figure 8:
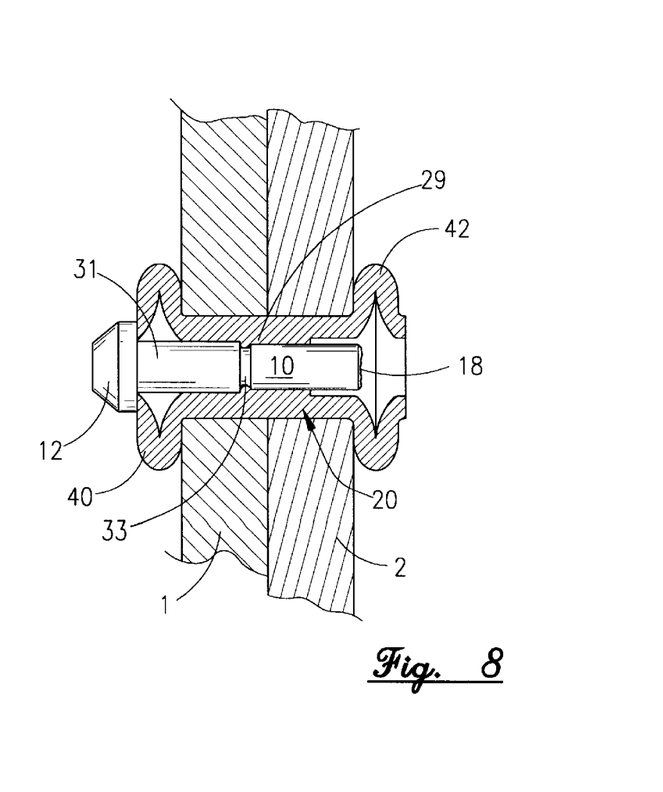
FIG. 8 the breakable-stem blind rivet according to FIG. 7 in the completely set-state.

In the embodiment according to FIGS. 7 and 8, the shell 20 basically is corresponding to the embodiment according to FIGS. 5 and 6 because hereto the areas 23, 25 being more easily deformable on both sides of the central section 21 have been formed by microstructural change of the material of the shell. In addition, in this embodiment of the breakable-stem blind rivet according to the invention in the central section 21 the wall thickness of the shell 20 is slightly enlarged by the fact that a section 29 having a smaller interior diameter is provided corresponding to the diameter of the mandrel 10. The mandrel 10 in a mandrel section 31 following its head is having a slightly enlarged diameter compared with the remainder of the mandrel, wherein the transition between the mandrel section 31 having the slightly enlarged diameter to the remainder of the mandrel, there is provided a groove 33. These features have the purpose to securely fix the section of the mandrel remaining in the blind rivet in the shell 20 after the setting.

The completely set-state of the blind rivet in the embodiment according to FIG. 7 is shown in FIG. 8. As shown, the section 31 of the mandrel 10 having the larger diameter has deformed the material of the section 39 of the increased wall thickness of the shell 20 into the groove 33 creating a positive form-fit between the broken-off section of the mandrel 10 remaining in the shell and the shell 20 itself.

Figure 9:
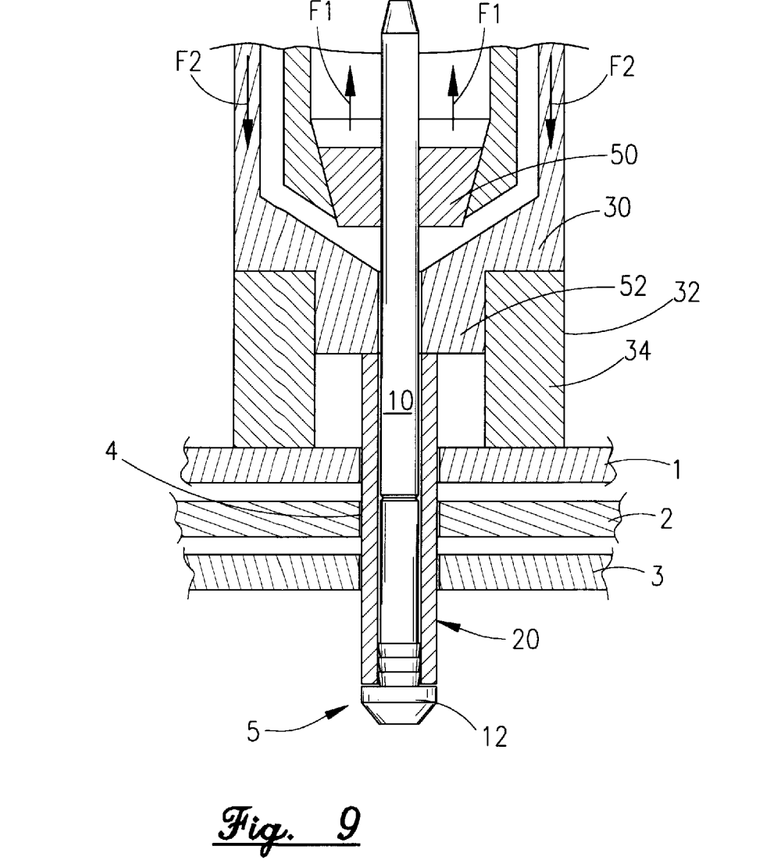
FIG. 9 a schematic cross-section of a first embodiment of the apparatus according to the invention before the beginning of the setting operation.
Figure 10:
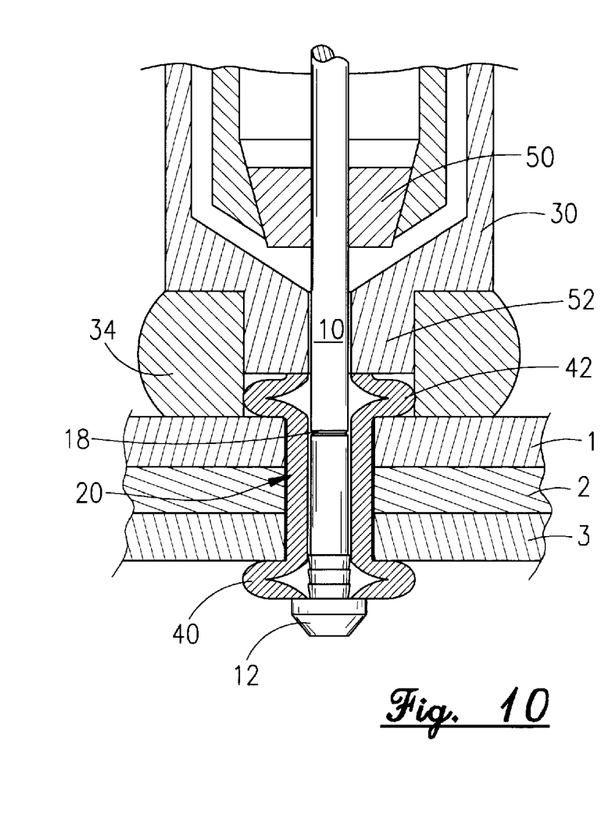
FIG. 10 the apparatus according to FIG. 9 after the completion of the setting operation.

In FIGS. 9 and 10 schematically in corresponding sectional views further embodiments of the apparatus according to the invention for setting breakable-stem blind rivets according to the invention. FIG. 9 herewith shows the beginning of the setting operation while FIG. 10 shows the end of the setting operation shortly before breaking-off the mandrel 10.

In the embodiment of the apparatus according to FIGS. 9 and 10, the workpiece pressing means is consisting of an elastic cylindrical body 34 of rubber, hard rubber, plastics or the like, surrounding the workpiece 30. On the beginning of the setting operation as shown on FIG. 9, the mandrel 10 is gripped by the gripping means 50 of the mouth piece 30, wherein an anvil 52 is bearing against the front end of the shell 20. The blind rivet 5 is inserted through the aligned bores 4 of three workpieces 1, 2, 3 to be connected in a loose fit, wherein between the workpieces 1, 2, and 3 in the beginning of the setting operation there are gaps present as this is shown in FIG. 10. By the gripping means 50 now a pulling force F1 is exerted on the mandrel 10, wherein the reactional forces F2 are received by the anvil 52. With the increasing of the pulling force F1, firstly, the closing head 40 on the blind side of the workpiece 1, 2, 3 is formed. Until the formation of the closing head 40 on the blind side of the workpieces, there is no movement of the shell 20 with respect to the mouth piece 30. After the formation of the closing head 40, however, the closing head by the mandrel and the gripping means 40 is pulled in the direction of the front side of the workpiece 1, wherein the front side is supported by the workpiece pressing means 32, i.e. the elastic body 34. As soon as the workpieces 1, 2, and 3 are closely in contact to each other by a futher exertion of the pulling force F1, the anvil begins to move in the direction of the front side of the workpiece 1 against the pressure of the elastic body 34 such, that by this movement under closely pressing the workpieces 1, 2, 3 together the closing head 42 on the front side is formed. Thereafter, the mandrel 10 is broken-off at the groove 18 forming the break-neck.

Figure 11:
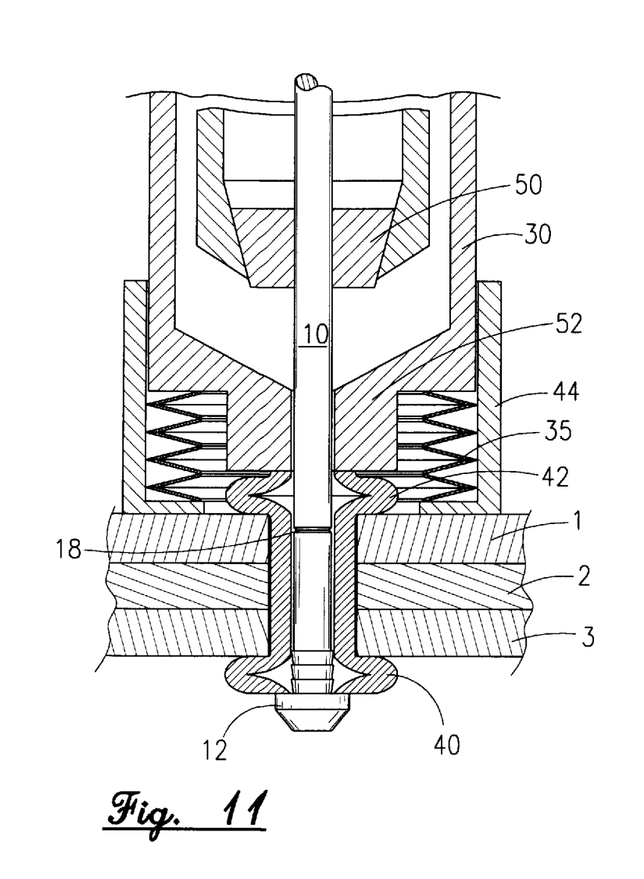
FIG. 11 a view corresponding to FIG. 10 of a second embodiment of the apparatus according to the invention, and FIG. 12 a view corresponding to FIG. 10 of a third embodiment of the apparatus according to the invention.
Figure 12:
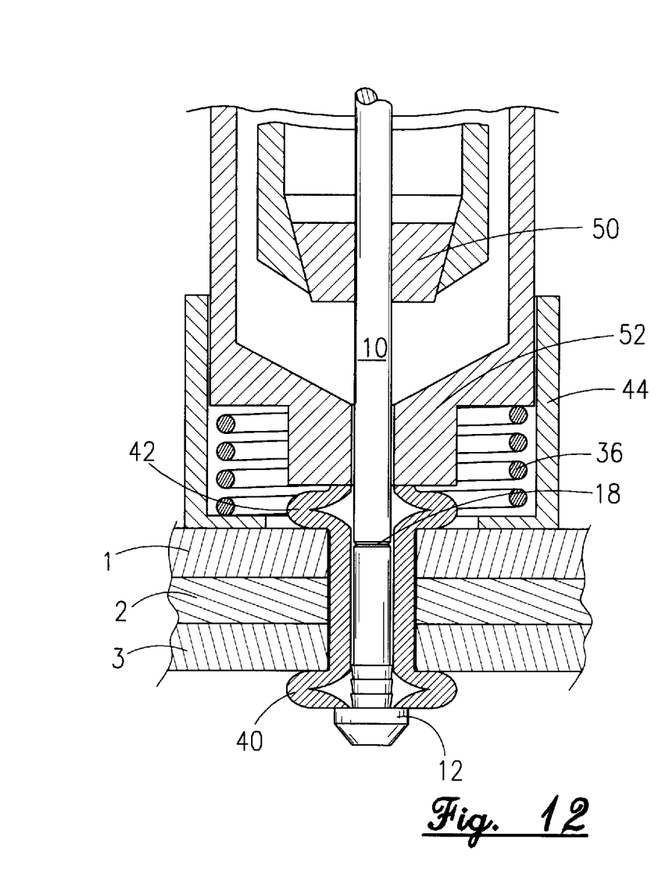

In the embodiment according to FIGS. 11 and 12, the workpiece pressing means 32 is performed such, that instead of the elastic body 34 the mouth piece 30 is surrounded by a cylindrical housing 44 which is axially moveable and which is prestressed with respect to the anvil 42 in the direction of the workpieces 1, 2, 3 in the embodiment according to FIG. 11 by a saucer spring 35 and in the embodiment according to FIG. 12 by a coil spring 36.

According to the invention, it is for the first time possible to connect workpieces by blind rivets even if these workpieces before the setting operation are not directly contacting each other. This is not possible with the conventional breakable-stem blind rivet since usually the grip range being present is not sufficient.

According to the invention, for the first time therefore with the newly designed breakable-stem blind rivet and the corresponding setting apparatus and by correspondingly controlling the workpiece pressuring apparatus it can be determined whether firstly the closing head on the blind side should be formed or whether both closing heads should be formed simultaneously.

Independent of whether the setting is performed according to the procedure of FIG. 2 or of FIG. 3 or FIGS. 9 to 12, respectively, the breakable-stem blind rivet according to the invention after the setting has the shape as shown in FIGS. 4, 6, 8, 10 to 12. Both closing heads are completely formed and the mandrel orderly has been broken at the break-neck 18 and securely is fixed in the closing head 40 on the blind side.

What is claimed:

1. Breakable-stem blind rivet comprising a stem (10) with an enlarged head (12) which is positioned in a shell (20), wherein the shell (20) before the beginning of a setting operation has an external diameter which at all points is smaller than an internal diameter of a hole (4), in which the breakable-stem blind rivet (5) is set and wherein the shell (20) on both sides of a central section (21) is provided with areas (23, 25) in which the shell (20) is more easily deformable than in the central section (21).

2. Breakable-stem blind rivet according to claim 1, wherein an axial length of the central section (21) basically is corresponding to a minimal grip range of the breakable-stem blind rivet (5).

3. Breakable-stem blind rivet according to claim 1, wherein the areas (23, 25) are formed by the shell (20) on both ends (22, 24) having a conically tapering shape.

4. Breakable-stem blind rivet according to claim 3, wherein the central section (21) is limited by two circumferential grooves (26, 28), the distance of which is corresponding to the minimal grip range.

5. Breakable-stem blind rivet according to claim 1, wherein the more easily deformable areas (23, 25) are formed by a microstructural change of a material of the shell (20).

6. Breakable-stem blind rivet according to claim 5, characterized in that the more easily deformable areas (23, 25) are formed by inductive annealing of corresponding areas of the shell (20).

7. Breakable-stem blind rivet according to claim 5, characterized in that the more easily deformable areas (23, 25) are formed by laser annealing of corresponding areas of the shell (20).

8. Breakable-stem blind rivet according to claim 1, wherein in the central section (21) there is provided a section (29) having a smaller interior diameter corresponding to a diameter of a mandrel (10) and increasing a wall thickness of the shell and, wherein the mandrel (10) has a mandrel section (31) adjacent to its head (12) having a larger diameter, wherein at a transition between the mandrel section (31) having the larger diameter and a remainder of the mandrel (10) there is provided a groove (33).

9. Apparatus for setting breakable-stem blind rivets (5) according to claim 1 comprising a mouth piece (30) receiving an end of a mandrel (10) in a gripping means (50) by a means of which the mandrel (10) with respect to an anvil (52) for the shell (20) contained in the mouth piece (30) can be drawn in the direction of a front side of a workpiece, wherein the mouth piece (30) is surrounded by a workpiece pressing means (32), that the workpiece pressing means (32) is relatively movable with respect to the mouth piece (30) and, that by means of the workpiece pressing means (32) a force can be exerted onto the front side of the workpiece.

10. Apparatus according to claim 9, wherein an exterior of the mouth piece (30) has a cylindrical shape and is coaxially surrounded by the workpiece pressing means (32).

11. Apparatus according to claim 9, wherein in that the workpiece pressing means in a controlled way can be advanced in the direction of the workpiece and is retractable up to the height of the mouth piece (30).

12. Apparatus according to claim 9, wherein in that the workpiece pressing means (32) is formed by an elastic body (34) consisting of rubber, hard rubber or the like.

13. Apparatus according to claim 9, wherein in that the workpiece pressing means (32) is pretensioned in the direction of the front side of the workpiece by a saucer spring (35).

14. Apparatus according to claim 9, wherein the workpiece pressing means (32) is prestressed in the direction of the front side of the workpiece by a coil spring (36).

* * * * *